3,065,244
PREPARATION OF NORDIHYDRO-ROTENONE
Masanao Matsui and Masateru Miyano, Tokyo, Japan, assignors to Sumitomo Chemical Company, Ltd., Osaka, Japan, a corporation of Japan
No Drawing. Filed Mar. 16, 1960, Ser. No. 15,267
Claims priority, application Japan Mar. 24, 1959
7 Claims. (Cl. 260—345.2)

This invention relates to an insecticide closely related to rotenone found as the major ingredient in the so-called Derris plants, such as *Derris elliptica* Benth and *Derris malaccensis* Prain. More particularly, it is concerned with nordihydro-rotenone. The chemical structure of this compound can be represented by the following formula:

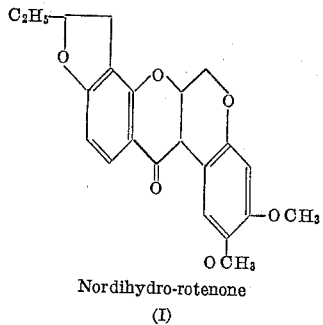

Nordihydro-rotenone
(I)

The invention is concerned also with the process of producing nordihydro-rotenone and with certain intermediates employed in the said process.

Derris has been known as a fish toxicant and one of the most famous vegetable insecticides from olden times. Because of having no injurious effects on plants, having a wide spectrum of applicable insects and especially having an effect on creeping insects beyond that of all other chemicals, it has been recommended for use in many fields. Besides an insect to which Derris is applied can scarcely be revived from asphyxia due to the narrow distance between the paralytic dosage and the fatal dosage for injurious insects. Consequently, Derris takes a unique position among agricultural chemicals with respect to reliable efficacy for insects. While many attempts have been made to synthesize active ingredients of Derris, such as, for example, rotenone (II) and degueline (III), none have been successful in obtaining the objective compound by either a partial or total synthesis.

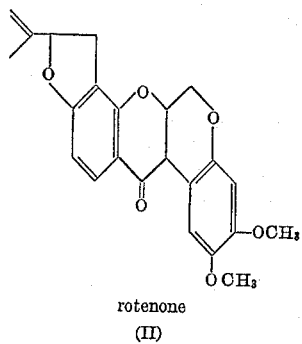

rotenone
(II)

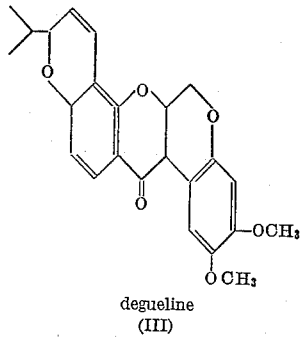

degueline
(III)

As for the reasons of such failure in synthesizing rotenone or its homologues, several facts have been pointed out, namely, it is very difficult to synthesize 2-substituted-dihydrobenzofuran (coumarane nucleus) compounds which are believed to be an important starting material, to synthesize derric acid derivatives by condensing derric acid derivatives with the said coumarane compounds, and to convert chromeno-chromone compounds into chromano-chromanone compounds.

Speaking of 2-substituted-dihydro-benzofuran compounds in more detail, the 2-isopropenyl-dihydrobenzofuran moiety found in the structure of rotenone may be derived from a natural product, for example tubaic acid (IV) is obtained by hydrolyzing rotenone with alcoholic potash, but by means of synthesis, merely a more stable rotenic acid type of compound, in which a double bond of the side chain is transferred into dihydrofuran nucleus to give a stable furan compound, is obtained. In fact, the compounds synthesized by Reichstein and by Harper were all such stable compounds as roteol (V), rotenic acid (VI) (Reichstein, T. and Hirt, R.; Helv. Chim. Acta., volume 16, pages 121–129, 1933), and 4-oxy-coumarone-5-carboxylic acid (VII) (Harper, S. H.; J. Chem. Soc., 1939, pages 1424–1427), each compound possessing a benzofuran nucleus therein.

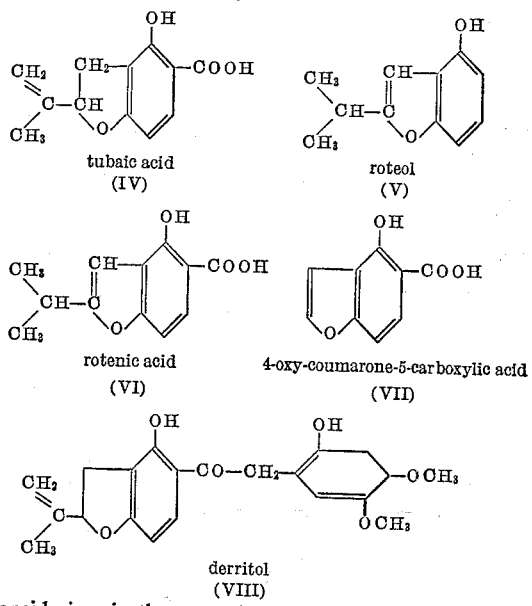

tubaic acid
(IV)

roteol
(V)

rotenic acid
(VI)

4-oxy-coumarone-5-carboxylic acid
(VII)

derritol
(VIII)

Considering, in the next place, the steps of forming the rotenone body, chromeno-chromone compounds have been successfully obtained by the so-called partial synthetic method up to this time, in which derritol (VIII) obtained by the hydrolysis of rotenone with an alcoholic potash is employed as the starting material. However, all attempts to synthesize a derritol type of compound itself by directly reacting a compound having coumarane nucleus with a derric acid derivative have ended in a failure. That is, the condensation of derric acid part with a certain type of phenol might be carried out successfully by the method of Takei et al. (Ber. volume 65, page 1041, 1932), wherein tetrahydro-tubanol (IX) was reacted with homoasaronic acid (X) to give tetrahydromethyl derritol (XI):

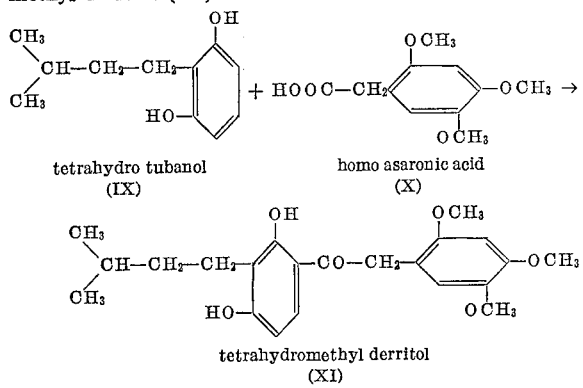

tetrahydro tubanol (IX)

homo asaronic acid (X)

tetrahydromethyl derritol (XI)

and by the method of Robertson, A. (J. Chem. Soc., 1933, pages 1163–1165), wherein tetrahydro-tubanol (IX) was condensed with 4,5-dimethoxy-2-cyanomethyl-phenoxy-acetic-acid methyl ester (XII) to give tetrahydro-derris acid (XIII):

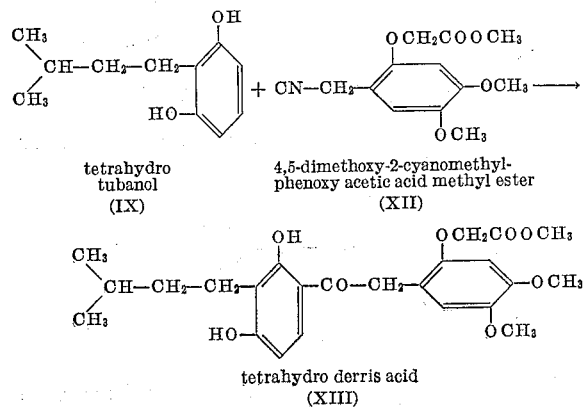

tetrahydro tubanol (IX)

4,5-dimethoxy-2-cyanomethyl-phenoxy acetic acid methyl ester (XII)

tetrahydro derris acid (XIII)

but the product thus obtained could not be converted into coumarane derivative by a conventional method such as ring closure of the side chain of the said phenol. This is why rotenone and its homologues have not yet been synthesized.

Furthermore, as the most difficult problem of synthesizing rotenone, even if the chromeno-chromone compound (XIV) were synthesized chemically, the objective chromano-chromanone compound (XV) would not be obtained by the reduction of the said compound. Furthermore, the chromano-chromanone compound (XV) is very unstable to oxidation unlike the common ketones; if it is exposed to a weak oxidizing agent, such as potassium ferricyanide and sodium acetate with iodine, it easily gives a chromeno-chromone compound (XIV). When it is exposed to air in the presence of an alkaline agent, it turns almost quantitatively to a type of hydroxy compound (XVI). Further, if it is reacted with a relatively strong oxidizing agent such as chromic acid it is finally turned into a type of diketone compound (XVII). On the other hand, the oxidation products of the chromano-chromanone are very resistant to reduction and the chromeno-chromone compound (XIV) derived from natural product can not be returned into an original chromano-chromanone compound (XV) by the usual catalytic reduction method.

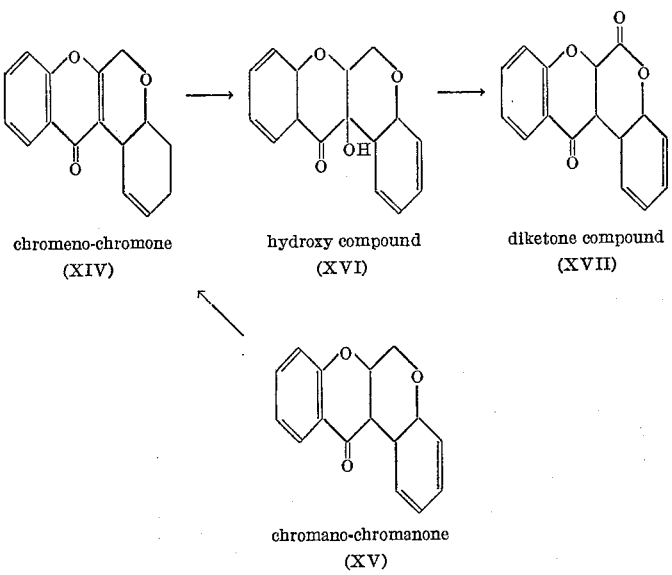

chromeno-chromone (XIV)

hydroxy compound (XVI)

diketone compound (XVII)

chromano-chromanone (XV)

As mentioned hereinabove, there are many difficult problems to be overcome in the synthesis of rotenone. In spite of the fact that it is recommended as a superior insecticide, rotenone is the sole vegetable insecticide that no one has heretofore been able to synthesize. Consequently, the source of supply must depend on natural derris plants as before, and the quantities of supply thereof fluctuates with the crop of the Derris plants, such as *Derris elliptica* Benth. and *Derris mallacensis* Prain, which is influenced by many factors, such as climatic conditions, earth characters and cultivation methods.

Speaking of these points in more detail, the cultivation of Derris plants is greatly limited by the areal factors. That is, the regions suited for the cultivation of the plants must have much rain, high humidity and an even high temperature all the year round, the land must be flat, rich, good draining and have sandy soil. Consequently, in practice, the regions are limited to few parts of the world, such as the Philippines, Malaya, Java, Borneo and few other countries.

The cultivation of Derris plants requires a complicated and troublesome procedure and an unduly long time until its harvest. That is, a lignified part is cut off from the big, strong and good mother tree, and the cutting thus taken is planted in a nursery-bed. After 2 or 3 months the young plant is transferred to the regular land, and thereafter scrupulous management, such as weeding, additional dressing and pest control, is required for a long period of time. In general, about 2.5 years of such management are required from the said transplanting to the harvest. Furthermore, the contents of active ingredients in the Derris plants vary markedly from root to root in accordance with factors, such as the species of plant, the age of the tree, harvest time, the size of root, and the part and the depth of root. Generally, fine root contains considerably larger quantities of active ingredients than that of big root. Thus, speaking in unsparing words, the Derris products have never been supplied in the state of constant content of active ingredients. On the contrary, if the rotenoid compound were synthesized chemically, the desired amount of such insecticide could be provided all year long and agricultural pesticides having a definite content of such active ingredients would be supplied economically.

Under these circumstances, the present inventors have studied about the synthesis of rotenone and found several notable facts as hereinunder described. First of all, we have found that 2-ethyl-4-hydroxy-coumarane is obtained from the known 2-acetyl-4-hydroxy-5-carbalkoxy-coumarone by employing any combination of techniques of catalytic reduction, hydrolysis and decarboxylation. That is, we have succeeded in synthesizing a certain type of 2-substituted-dihydro-benzofuran compound. Further, we have also found that a chromeno-chromone compound (XIV) derived from natural rotenone or rotenone homologues is reduced by using a specific reagent, metallic hydride compound, to a new type of compound having hydroxychromano-chromanone nucleus (XVII), and that a chromano-chromanone compound (XV) is easily obtained with good yield from this new hydroxy compound (XVII) by the so-called Oppennauer oxidation process using ketones and aluminium alkoxide.

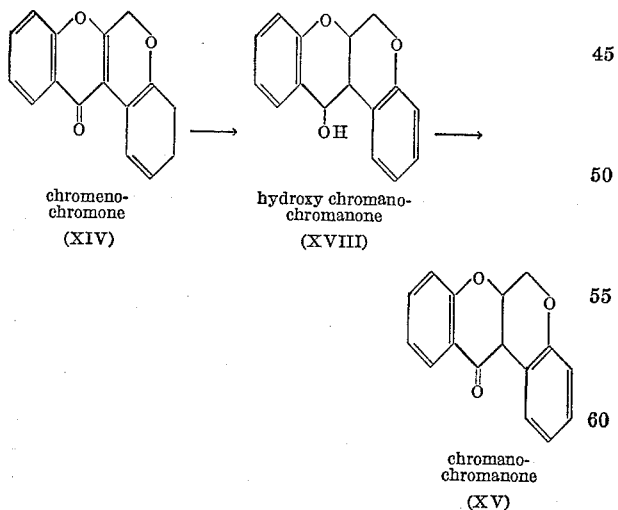

chromeno-
chromone
(XIV)

hydroxy chromano-
chromanone
(XVIII)

chromano-
chromanone
(XV)

Furthermore, we have found that a phenyl-benzylketone derivative of the general formula:

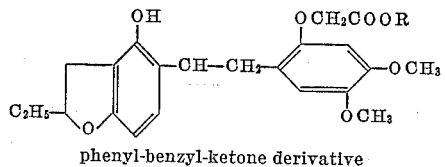

phenyl-benzyl-ketone derivative wherein R stands for a lower alkyl radical such as methyl and ethyl, may be conveniently prepared by reacting 2-ethyl-4-hydroxy-coumarane with a derric acid derivative of the formula:

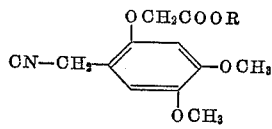

wherein R has the same meaning as hereinabove mentioned, through the so-called Hoesch reaction, and that the product thus prepared may be easily derived to a chromeno-chromone compound (XIV) through a dehydrative ring closure by employing a conventional dehydration method of heating in an acetic anhydride in the presence of sodium acetate.

By the combination of our above described knowledge, a compound having a structure similar to rotenone, such compound being considered impossible to synthesize chemically, may be successfully prepared through a total synthesis.

A still more important discovery is that the new rotenone homologue, nordihydro-rotenone (I), obtained by the method of this invention has an equal efficacy for insects as natural rotenone and is very useful as an agricultural insecticide as it is, namely, in the dl-form.

It is therefore an object of the present invention to provide a novel process for manufacturing a novel insecticide, nordihydro-rotenone, by a commercially feasible method, and to provide nordihydro-rotenone.

Another object is to provide several compounds useful as intermediates for obtaining new and useful nordihydro-rotenone.

Still another object is to provide a total synthetic method of preparing rotenone homologues and to indicate a feasible method for obtaining rotenone itself in the near future. The other objects and advantages of the invention will be apparent from the following descriptions.

To attain the above stated objects, there is provided in the present invention a process for preparing nordihydro-rotenone, which process involves a number of steps and can be illustrated by the following scheme of equations:

STEP 1

Nordihydro-tubanol (XIX), which is a new compound obtained by our novel method as described hereunder, is reacted with 2-cyanomethyl-4,5-dimethoxy-phenoxy acetic acid ester (XX) and subsequently subjected to hydrolysis to form nordihydro-derris acid (XXI),

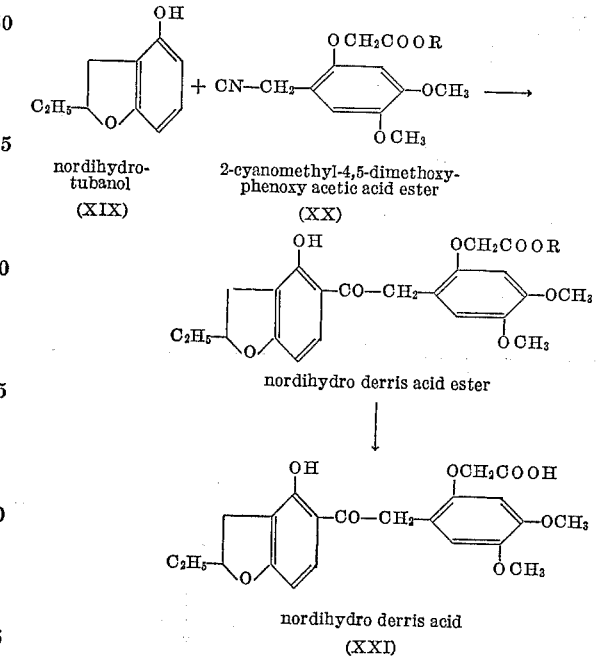

nordihydro-
tubanol
(XIX)

2-cyanomethyl-4,5-dimethoxy-
phenoxy acetic acid ester
(XX)

nordihydro derris acid ester nordihydro derris acid
(XXI)

wherein R stands for a lower alkyl radical, such as methyl and ethyl. The above mentioned condensation reaction is believed to be a Friedel-Craft's reaction, and is generally called Hoesch's reaction, in which a nitril and a phenol are condensed with each other in absolute ether in the presence of zinc chloride and hydrochloric acid gas or aluminium chloride at room tempertaure. Such conditions are successfully employed in the present condensation reaction. The hydrolysis may be preferably carried out by using alcoholic potash. Nordihydro-derris acid thus produced has a melting point of 162°–163° C. and is a new compound.

STEP 2

Nordihydro-derris acid (XXI) is subjected to dehydration by heating whereby ring-closure is effected and nor-dihydro-dehydrorotenone (XXII), which is a new compound having a melting point of 220° C., is formed.

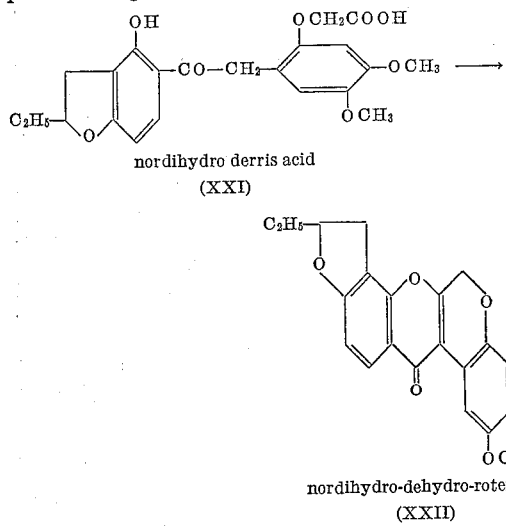

nordihydro derris acid
(XXI)

nordihydro-dehydro-rotenone
(XXII)

The above reaction is considered to be a Perkin's reaction; the reaction is effected by heating in acetic anhydride in the presence of sodium acetate or pyridine or by heating in the mixed solution of acetic anhydride and acetic acid in the presence of acetic amide.

STEP 3

Nordihydro-dehydro-rotenone (XXII) is reduced to nordihydro rotenol (XXIII).

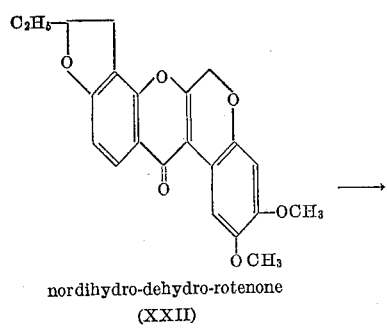

nordihydro-dehydro-rotenone
(XXII)

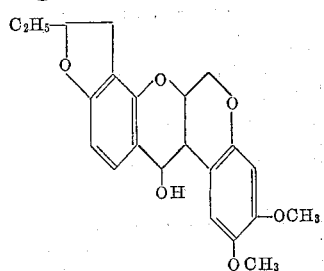

nordihydro-rotenol
(XXIII)

The reduction can be successfully carried out by using an alkali metal borohydride, such as sodium borohydride, potassium borohydride and lithium borohydride. The product thus obtained is a new compound having melting point of 130°–135° C.

STEP 4

Finally, nor-dihydro-rotenol (XXIII) is transformed to nordihydro-rotenone (I) by using the so-called Oppennauer oxidation method, in which a ketone and an aluminium alkoxide are employed with an inert solvent.

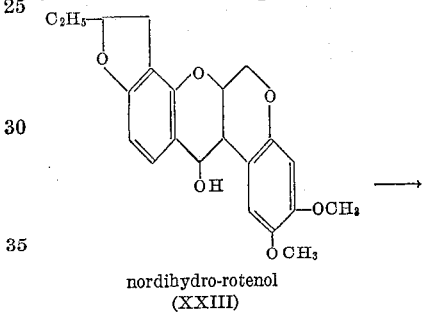

nordihydro-rotenol
(XXIII)

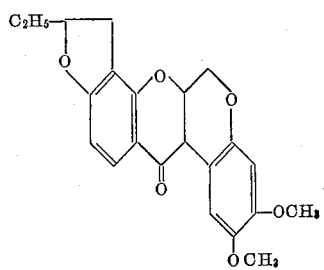

nordihydro-rotenone
(I)

In the above described Oppennauer oxidation method, any ketone commonly known may be utilized, but it is preferable to chose from such ketones as acetone, cyclohexanone and diphenyl ketone. As an aluminum alkoxide, a compound such as aluminium isopropylate and aluminium tert.-butylate may be preferably used. As the solvent, an organic solvent such as benzene, toluene and xylene which may not have any influence on the said oxidation reaction, can be conveniently utilized.

The nordihydro-tubanol (XIX) utilized as a starting material in the method of this invention is a new compound synthesized by us according to the following scheme of equation:

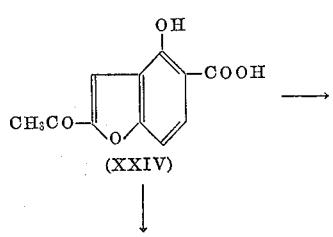

(XXIV)     (XXV)     (XXVI)

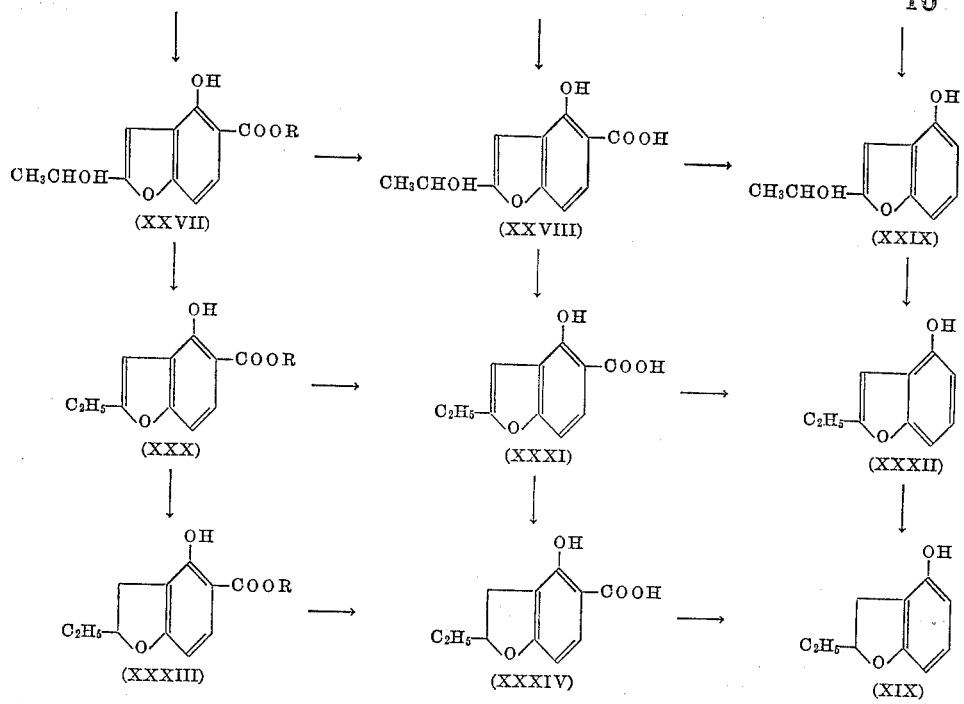

That is, 2-acetyl-4-hydroxy-5-carbalkoxy-coumarone (XXIV) synthesized from 3-formyl-β-resorcylic acid methyl ester by Shamshurine A.A. (Chem. Abst. volume 41, page 6237, 1947) is employed as a starting raw material, and nordihydro-tubanol (XIX) is obtained therefrom in good yield by employing the combination of steps comprising three catalytic reduction steps, which may be carried out either by a single process or one by one, hydrolysis step of carbalkoxy group to carboxyl radical, and decarboxylation step, in any order. Consequently, 2-acetyl-4-hydroxy-5-carbalkoxy coumarone (XXIV) may be connected to the compound (XXXIII) through a single process of reduction with 3 mols of hydrogen and then to nordihydro-tubanol (XIX) via compound (XXXIV), or said coumarone may be converted to a compound (XXVIII) by employing 1 mol of hydrogen and subsequently hydrolyzing the compound (XXVIII) thus obtained is again subjected to reduction with 2 mols of hydrogen and then converted to the objective nordihydro-tubanol (XIX). Other routes may be freely chosen by those skilled in the art.

Our new rotenoid compound, nordihydro-rotenone, has three asymmetric carbon atoms in its molecule just like the case of rotenone, thus it is expected to have eight different stereo-isomers. The crystals produced by the method of this invention are all dl-form of colourless plates having a melting point of about 150°–152° C. However, as hereinafter disclosed, the present compound shows as remarkable efficacy for insects as that of natural rotenone even in the dl-body so that it is not necessary to resolve the dl-body into each of the stereo-isomers. As the present compound is considered to be such material that the isopropenyl radical sited in the second position of the coumarane nucleus in rotenone is merely replaced by the ethyl radical, having only one less carbon atom, our new compound resembles rotenone not only in molecular structure, but also in physical and chemical properties. That is, the present compound has the following similar characteristics with that of rotenone, namely: it is insoluble in water but soluble in various kinds of organic solvents, such as benzene, chloroform and ethylene dichloride, it is a highly stable compound in chemical reactions except that it is relatively easily affected by an alkaline agent, and the chloroform solution of the said compound has a similar absorption band in the infrared absorption spectrum with that of l-dihydro-rotenone. The more important point is that dl-nordihydro-rotenone obtained by the method of this invention has almost the same degree of efficacy and range of application for various kinds of agricultural pests and indoor insects as those of rotenone as a repellent, stomach poison and contact insecticide. One example embodying the effectiveness for insects of the compound obtained by the method of this invention, compared with that of naturally occurring rotenoid compounds is shown as follow: Some groups of alcoholic solutions were made from synthesized dl-nordihydro-rotenone, rotenone and degueline, and they were diluted with water to concentrations varying from 1/1000 to 1/10,000. The alcoholic solutions thus prepared were sprayed on soy bean aphid and *Aphis glycines* Matsumura; their efficacies were measured. The ratio of comparative efficacies was shown as about 100:100:1. The present compound had almost the same degree of efficacy for thrips, leaf hoppers, cockroaches and lice as that of rotenone.

The present compound is as violently poisonous to cold-blooded animals as is rotenone (for example, it kills a water flea on the spot at a concentration of merely 10 p.p.m.), but it is not particularly poisonous to warm-blooded animals (for example, when as much as 2 grams per kilogram of weight of nordihydro-rotenone are orally administered to a rabbit or dog in a pure crystalline form, there are no feasible physiological changes in the said experimental animal, and the crystalline compounds thus administered are all found in the feces without any decomposition or metabolation. Judging from the above mentioned phenomenon, it appears that the present compound is excreated as it is because of the slight solubility in either water, alkali or acid, just like rotenone, thus it is as safely employable as rotenone.

As mentioned above, the present compound is quite soluble in common organic solvents such as benzene, acetone and chloroform, and is stable in various chemical reactions (except with alkali) so that the compound may be freely formulated in any type of agricultural insecticides by conventional methods well known to those skilled in the art, with only the above-indicated exception. Thus, the compound of this invention may be formulated in a form of oil by using a common basal oil, such as, xylene and kerosene, in a form of emulsifiable liquid using such material as sulphated oil, cresol soap and soapless soap, and also in a form of emulsion by employing a suitable emulsifier, such as Toximal MP (a manufacture of Ninol Laboratory, anionic and nonionic surface active agent), Triton X–100, X–120 and X–155 (Rohm & Haas Co., nonionic surface active agent containing alkyl allyl polyether alcohol) and Emcol H–140 (Emulsol Chem. Corp., anionic surface active agent). Further, the compound may be formulated in a form of powder by using a common neutral carrier, such as starch, diatomaceous earth and pilophilite, may be admixed into a common aerosol composition and may be formed into a semi-solid type of composition. Moreover, this compound may be admixed with any conventional agricultural chemicals in any proportion except with an alkaline agent. The techniques of these formulations will be apparent and readily handled by any persons who utilize derris for a period of time and are skilled in the art.

The compositions thus formulated are very useful as a contact insecticide for various injurious insects, such as aphides, loopers, diamond-back moth, poisonous moths, leaf bettles, weevils and garden crickets, and as a stomach poison for various chewing type of pests, such as cankerworm, cabbage worm, mexican bean beetle, and cucumber beetle and as a repellent for various injurious insects. Further, these compositions are especially effective for the so-called indoor pests, such as bed-bug, tick, louse, fly, mosquito and ant and for many dermal pests of domestic animals. The present compound is also useful as an insect-proofing agent for wool, raw-silk, cloth and paper. Other uses will be more and more widely developed from this time forth.

The optimum ratio for the application of the present composition must adequately be chosen and determined according to the species of insect to which it is applied, the instar of the said insects, the weather, conditions and the like. In general, however, the present compound will effectively control most kinds of insect pests at the concentration of from 0.1% to 0.002%. The present compositions of matter cause no more phyto-damage than other vegetable insecticides. Thus, dl-nordihydrorotenone, which is a new rotenoid compound synthesized chemically by so-called total synthesis and is closely comparable with natural rotenone in effectiveness for insects, toxicity and phyto-damage, can be provided by the present invention.

The following examples further illustrate this invention which, however, is not limited to these examples.

EXAMPLE 1

*2-Acetyl-4-Hydroxy-5-Carbomethoxy-Coumarone*

20 grams of 3-formyl-β-resorcyclic acid methyl ester were added to 250 milliliters of methanol, and the mixture was added to a solution of 6 grams of sodium hydroxide in 10 milliliters of water. Yellow crystals of the sodium compound precipitated. 20 grams of chloroacetone were added thereto and the mixture was refluxed for 5 hours. After cooling, the precipitated crystals were filtered, washed with water and then with methanol. Thus, 18 grams of crude product were obtained. The melting point of the said product was about 170° C. Upon recrystallization from chloroform-acetone-methanol mixture, 15 grams of pure crystals of 2-acetyl-4-hydroxy-5-carbomethoxy-coumarone were obtained. The melting point of the pure crystal was 1770 C. Furthermore, 2.6 grams of raw material, 3-formyl-β-resorcyclic acid methyl ester, were recovered from the first mother liquid.

EXAMPLE 2

(A) *2-Ethyl-4-Hydroxy-5-Carboxy-Coumarane (Nor-Dihydro-Tubaic Acid (XXXIV))*

To 150 milliliters of pure glacial acetic acid, 7.5 grams of 2-acetyl-4-hydroxy-5-carbomethoxy-coumarone (XXIV R=CH$_3$) and 1.0 gram of platinum oxide were suspended, and the combined mixture was shaken in a stream of hydrogen gas. In a period of one hour and a half 2250 milliliters of hydrogen were absorbed therein. The catalysts were filtered off, and the filtrate was evaporated, leaving colourless oil. The oily product was then mixed with 100 milliliters of 10% aqueous caustic soda solution, and the combined mixture was refluxed for 40 minutes. After cooling, the mixture was acidified with hydrochloric acid, and the precipitated crystals were filtered. Upon recrystallization from 100 milliliters of 70% aqueous methanol, 4.6 grams of pure 2-ethyl-4-hydroxy-5-carboxycoumarane were obtained. The melting point of the pure product was 125°–127° C. The yield was 69% of theory from 2-acetyl-4-hydroxy-5-carbomethoxy-coumarone.

*Analysis.*—Found: C, 63.46; H, 5.64%. Calculated for C$_{11}$H$_{12}$O$_4$: C, 63.45; H, 5.81%.

(B) *2-Ethyl-4-Hydroxy-Coumarane (Nordihydro-Tubanol (XIX))*

3 grams of 2-ethyl-4-hydroxy-5-carboxy-coumarane (XXXIV) were heated for 20 minutes in an oil bath, whose temperature was held within the range from 220° to 230° C., and then subjected to vacuum distillation. The fraction of 123° C./3.5 mm. Hg, $n_D^{22.5}$ being 1.5537, was redistilled under reduced pressure, and pure 2-ethyl-4-hydroxy-coumarane was obtained, the boiling point being 123°C./3.5 mm. Hg, and $n_D^{22.5}$ being 1.5557.

*Analysis.*—Found: C, 72.15; H, 7.27%. Calculated for C$_{10}$H$_{12}$O$_2$: C, 73.14; H, 7.37%.

EXAMPLE 3

*2-Ethyl-4-Hydroxy-Coumarane (Nor-Dihydro-Tubanol (XIX))*

To 150 milliliters of ethyl acetate, 10.8 grams of 2-acetyl-4-hydroxy-5-carbomethoxy-coumarone, (XXIV) (R=CH$_3$) and 4 grams of 10% palladium charcoal were suspended, and the combined mixture was shaken in a stream of hydrogen gas. In a period of about 20 hours, 1680 milliliters of hydrogen were absorbed; thereafter the hydrogenation velocity was markedly decreased so the catalyst was filtered off. The filtrate was distilled to remove the solvent, and the residue thus obtained was combined with 150 milliliters of glacial acetic acid and 0.2 gram of platinum oxide, and the hydrogenation was resumed. When 500 milliliters of hydrogen were re-absorbed, the reaction was stopped, and the catalyst was filtered off. The filtrate thus obtained was evaporated, and the residue was boiled for 1 hour with 200 milliliters of 5% caustic soda aqueous solution. After cooling, the solution was acidified with hydrochloric acid to precipitate the crystals. The product was filtered, washed with water and dried. Thus, 6.5 grams of crude crystals having a melting point of 155°–160° C. were obtained. Upon recrystallization from benzene, pure 2-ethyl-4-hydroxy-5-carboxy-coumarone (nor-rotenic acid (XXXI)) were obtained. The melting point of the compound was 170°–172° C.

15 grams of nor-rotenic acid (XXXI) and 1 gram of platinum oxide were suspended into 150 milliliters of pure glacial acetic acid and the mixture was shaken in a stream of hydrogen gas. In a period of 2 hours, 1700 milliliters of hydrogen were absorbed, and then the hydrogenation reaction was stopped. The catalyst was filtered off and the filtrate was evaporated in vacuo to remove the solvent. Upon recrystallization of the residue from 70% aqueous methanol solution, 12.3 grams of 2-ethyl-4-hydroxy-5-carboxy-coumarane [nor-dihydro-tubaic acid (XXXIV)] were obtained. The melting point of this acid was 126°–127° C. When the said tubaic acid (XXXIV) was heated on an oil bath, whose temperature was held at 220°–230° C., for 20 minutes and thereafter subjected to vacuum distillation, the object nor-dihydro-tubanol (XIX) was obtained. The boiling point of the nordihydro-tubanol was 123° C./3.5 mm. Hg.

The examples 2 and 3 are shown only as typical embodiments to illustrate the manufacturing method of nor-dihydro-tubanol, and, as stated hereinbefore in the specification, nordihydro-tubanol may be prepared from 2-acetyl-4-hydroxy-5-carbalkoxy-coumarone (XXIV) by using the combination of steps of hydrogenation, hydrolysis and decarboxylation process in any order.

EXAMPLE 4

Nordihydro-Derris Acid (XXI)

7 grams of nordihydro-tubanol (XIX) and 15 grams of 2-cyanomethyl-4,5-dimethoxy-phenoxy-acetic acid methyl ester (XX) were dissolved into 120 mililiters of absolute ether. To this, 18 grams of zinc chloride were added, and dry hydrochloric acid gas was introduced into the mixed solution under vigorous stirring and ice-cooling. The inner temperature of the said reaction mixture was held at 5–10° C. A uniform emulsion changed its colour to brown immediately after the introduction of hydrochloric acid gas. The introduction of the gas was continued for 5 hours further at a temperature of from 5° to 10° C., and thereafter the reaction mixture was allowed to stand at room temperature (about 20° C.) for 40 hours. The mixture formed two layers. To this, 150 milliliters of absolute ether were added, and after 1 hours the upper layer was taken off. The remaining oily layer was combined with 50 milliliters of water and heated for 2 hours on a boiling water bath. After cooling, the water part was taken off, and the residual liquid was dissolved in ethyl acetate, washed with sodium bicarbonate aqueous solution and evaporated. The remaining liquid was boiled for 40 minutes with 10% aqueous caustic soda solution to accomplish the hydrolytic decomposition. After cooling, the solution was acidified with diluted hydrochloric acid and extracted with ethyl acetate; the extract was washed with sodium chloride aqueous solution. Then the solution was distilled to remove ethyl acetate, and the residue was treated with active charcoal and thereafter dissolved in 30 milliliters of 95% ethanol. A colourless silk like crystal was obtained. The melting point of the product was 160° C. The yield was 1.7 grams. In order to take up the acid part dissolved in the said sodium bicarbonate aqueous solution, the solution was acidified with hydrochloric acid and extracted with ethyl acetate; the extract was washed with sodium chloride aqueous solution. After removal of the solvent, the residue was dissolved in 30 milliliters of 95% ethanol. A colourless silk like crystal was obtained. The yield was 2.0 grams. The melting point of the product was 160° C. The mother liquids were combined and concentrated to 30 mililiters and treated with active charcoal. From this liquid 0.4 gram of crystal was obtained. The total yield was 4.1 grams, and this corresponds to 22% of theory from nordihydro-tubanol. Upon further purification from 95% ethanol, pure nordihydro-derris acid (XXI) was obtained. The melting point was raised to 1562°–3° C.

*Analysis.*—Found: C, 60.84; H, 6.15%. Calculated for $C_{22}H_{24}O_8 \cdot H_2O$: C, 60.82; H, 6.03%.

By a process similar to that of the above-described example, nordihydro-derris acid, melting point 162° C., was obtained from nordihydro-tubanol and 2-cyanomethyl-4,5-dimethoxy-phenoxy-acetic acid ethyl ester [(XX), $R=C_2H_5$], the melting point of which is 77–78° C.

EXAMPLE 5

Nordihydro-Dehydro-Rotenone (XXII)

A mixture of 2.8 grams of nordihydro-derris acid (XXI), 1.2 grams of sodium acetate and 40 milliliters of acetic anhydride was refluxed for 13 minutes. To this, 100 milliliters of a mixed solution of water and ethanol (10:15 by weight) were added and then cooled. 0.3 gram of crystals was obtained. The mother liquid was charged into water and extracted with chloroform; the extract was dried with potassium carbonate. After concentration in vaccuo, the residue was combined with 15 milliliters of alcohol and added to a solution of 3 grams sodium hydroxide in 20 milliliters water; then the combined solution was allowed to stand at room temperature. From this solution, about 0.6 gram of crystals was obtained. The combined amounts of crude product, about 0.9 gram, was then recrystallized from dioxane. About 0.45 gram of pure product was obtained. This compound had the melting point of 220° C. and was confirmed to be nordihydro-dehydro-rotenone (XXII) by the result of elementary analysis.

*Analysis.*—Found: C, 69.31; H, 5.23%. Calculated for $C_{22}H_{20}O_6$: C, 69.47; H, 5.26%.

EXAMPLE 6

Nordihydro-Dehydro-Rotenone (XXII)

A mixture of 3 grams of nordihydro-derris acid (XXI), 1.3 grams of sodium acetate, 43 milliliters of acetic anhydride and 2 milliliters of acetic acid was refluxed for 13 minutes. To this, 100 milliliters of a mixed solution of water and ethanol (10:15 by weight) were added, and the solution was cooled. 0.38 gram of crystals was obtained. The mother liquid was evaporated, and the residue was treated again with a mixture of 40 milliliters of acetic anhydride and 1.2 grams of sodium acetate. To this, 100 milliliters of the ethanol-water mixed solution were added, and the solution was cooled. Thus, 0.05 gram of crystals was obtained. The mother liquid was charged into water and extracted with chloroform; the extract was distilled to remove the solvent. The residue thus obtained was added to a solution of 3 grams of potassium hydroxide in 20 milliliters of water, and the combined mixture was refluxed to accomplish saponification. Thereafter the mixture was acidified with hydrochloric acid and extracted with ethyl acetate. After removal of the solvent and recrystallization of the residue from ethanol, about 1.5 grams of starting material, nordihydro-derris acid, were recovered.

The product obtained by the method of this example had a melting point of 218°–220° C., and was identified with nordihydro-dehydro-rotenone (XXII) obtained by the method of preceding Example 5 through the so-called mixed examination and elementary analysis.

EXAMPLE 7

Nordihydro-Rotenol (XXIII)

0.5 gram of nordihydro-dehydro-rotenone (XXII) was dissolved in 30 milliliters of dioxane which were preheated to a temperature of from 60° to 65° C. To this, a solution of 0.1 gram of sodium-boro-hydride in 4 milliliters of 90% ethanol was added. The combined solution was held at 60°–65° C. for 30 minutes and thereafter allowed to stand at room temperature for 24 hours. After adding 5 milliliters of acetone, the solution was allowed to stand for 2 hours. The solvent was then distilled off under reduced pressure. The residue was dissolved in chloroform; the chloroform solution was washed with sodium chloride aqueous solution and dried with potassium carbonate. The solvent was distilled off. Upon standing overnight, the oily residue (about 0.5 gram) was turned partly into white crystals of the hydroxy compound, namely, nordihydro-rotenol (XXIII). The melting point of the crystal was 130°–135° C. Analysis. Found: C, 68.21; H, 6.42%. Calculated for $C_{22}H_{24}O_6$: C, 68.73; H, 6.29%. The oily part was thought to be the same objective nordihydro-rotenol, for the most part.

*Analysis.*—Found: C, 67.28; H, 7.01%. Calculated for $C_{22}H_{24}O_6$: C, 68.73; H, 6.29%.

EXAMPLE 8

Nordihydro-Rotenone (I)

To the nordihydro-rotenol (XXIII) obtained by the method of preceding Example 7 (about 0.5 gram, including crystal and oily parts), a mixture of 4 grams of aluminum isopropylate, 40 milliliters of benzene and 30 milliliters of acetone was added. The combined mixture was refluxed for 9 hours in the stream of dry nitrogen gas. After cooling, a reaction mixture was poured into a diluted sulfuric acid and an organic layer was extracted with 100 milliliters of benzene. The benzene layer was washed with a small portion of diluted sulfuric acid and then twice with a sodium chloride aqueous solution. Thereafter the layer was dried with potassium carbonate and concentrated in vaccuo. In this case, the accompanying mesityl oxide was removed by the rapid introduction of an air stream. The residual liquid was then dissolved in 10 milliliters of benzene, and the solution was adsorbed on 12 grams of active alumina. The said alumina was washed twice, each time with 25 milliliters of benzene. From the first benzene solution an acetone polymer was obtained, and from the second benzene solution 10 milligrams of unchanged nordihydro-dehydro-rotenone were recovered. Thereafter the said alumina was eluted several times, each with 30 milliliters of chloroform. From the first 30 milliliters of eluted solution, 150 milligrams of almost colourless oily product were obtained. The chloroform solution of this product showed an absorption band of the infrared absorption spectrum similar with that of l-dihydro-rotenone.

Furthermore, from the next 120 milliliters of eluted solution, which is the combined solution of from the second to the fifth elutions, 10 milligrams of oily product were obtained. The combined oily product, about 160 milligrams, was dissolved in 1.5 milliliters of ethanol, and the colourless crystals were precipitated out after 4 hours' standing. Upon recrystallization from ethanol, 80 milligrams of nordihydro-rotenone were obtained as a colorless plate crystal. The melting point of this compound was 150°–152° C. The yield corresponds to 15.7% of theory from nor-dihydro-dehydro-rotenone (XXII).

*Analysis.*—Found: C, 68.89; H, 6.00%. Calculated for $C_{22}H_{22}O_6$: C, 69.10; H, 5.80%.

EXAMPLE 9

2 parts of dl-nordihydro-rotenone were combined with 1 part of Triton X–100, as an emulsifier, and 97 parts of solvent naphtha to give a uniform emulsion type of composition.

1 part of dl-nordihydro-rotenone was combined with 0.5 part of Triton X–150 and the mixture was added dropwise to 98.5 parts of talc (200 mesh) under vigorous stirring in crusher to give a 1% water-miscible type of powder.

1 part of dl-nordihydro-rotenone was added to 99 parts of kerosene to give a 1% oil composition.

2 parts of dl-nordihydro-rotenone were added to 1 part of pyrothrin, 2 parts of Emcol H–140 and 95 parts of benzene to give a uniform emulsion type of composition. All parts are by weight in this example.

EXAMPLE 10

Rotenone and dl-nordihydro-rotenone were dissolved, respectively, in acetone, and each of the acetone solutions thus obtained was suspended in physiological saline solution to give test media of various concentrations. To these test media a group of 40 water-fleas (*Daphnia longistina*) was added to each, and the kill percent was measured. The water-fleas employed in the test of this example were all in the fourth instar, and the temperature of said media was 21° C. As the efficacy of rotenoid compounds for the water-flea was observed on the spot, each kill percent was measured immediately after the addition of a small quantity of physiological saline solution on which the water-fleas are floated to the said test medium. The results of the tests were as follows:

TEST FOR WATER-FLEA

| Concentration, p.p.m. | Rotenone kill percent | dl-Nordihydro-rotenone kill percent |
|---|---|---|
| 10 | 100 | 100 |
| 1 | 100 | 75 |
| 0.1 | 100 | 50 |

According to the above table, the present compound possesses almost the same degree of toxicity for cold-blooded animals as rotenone.

EXAMPLE 11

The mitochondrial fraction of the muscle of the American cockroach (*Periplaneta Americana* L.) was prepared by a slight-modification of the techniques reported by Sacktor (Arch. Biochem. and Biophy., volume 45, pages 349–365, 1953). That is, about 5 grams of thorax parts, including middle legs, femur muscles of hind legs and thorax muscles, of each of ten individual of male and female cockroaches were ground thoroughly and homogenized with 50 milliliters of a mixed solution of 0.02 mol of sodium glutamate, 0.02 mol of phosphate buffer solution (pH 7.2) and 0.25 mol of cane sugar. In this case, in order to avoid a decrease of pH value, 0.5 mol (pH 8.2) of tris-(hydroxymethyl)-aminomethan buffer was added dropwise to keep the original pH value, using test paper. The homogenate was filtered through a gauge, and the filtrate was centrifuged at 500×G for 5 minutes. An upper clear solution was centrifuged at 10,000×G for 15 minutes. The precipitated material was collected and again suspended in 13 milliliters of a mixed solution of 0.02 mol of sodium glutamate, 0.02 mol of phosphate buffer (pH 7.2) and 0.9% of potassium chloride. After again centrifuging the suspension at 8000×G for 5 minutes, the precipitate was collected. The substance thus obtained was suspended in 5 milliliters of a mixed solution of 0.02 mol of sodium glutamate, 0.02 mol (pH 7.2) of phosphate buffer, 0.9% of potassium chloride and $10^{-5}$ M of cytochrome C, and this was used for the following tests as the mitochondrial suspension.

1.8 milliliters of the said mitochondrial suspension were put into a conventional Warburg apparatus. To this, 0.2 milliliter of either 10% aqueous acetone only or 10% aqueous acetone containing $10^{-5}$ M rotenone or dl-nordihydro-rotenone was added. After pre-incubation for 10 minutes at 30° C., oxygen uptake measurements were conducted as to each case. By measuring the oxygen uptake amounts in mm.$^3$ after one hour's incubation at 30° C., the percent inhibition of rotenone or nordihydro-rotenone against glutamic dehydrogenase activity of the cockroach was determined. The results were as follows:

| Insecticide | Oxygen uptake amounts per hour in mm.$^3$ | Percent inhibition |
|---|---|---|
| Control | 150.6 | |
| Rotenone | 7.7 | 95.0 |
| dl-Nordihydro-rotenone | 11.7 | 92.4 |
| dl-Nordihydro-dehydro-rotenone | 152.8 | 0 |

According to the studies of Fukami and Tomizawa (Botyū-Kagaku, volume 21, page 129, 1956; Botyū-Kagaku, volume 23, pages 1–4, 1958), it has been concluded that rotenone inhibits the respiration of the muscle and the nerve in the insect body, and the inhibition of the respiratory metabolism is partly due to the inhibition of the glutamic dehydrogenase activity in the insect body.

From the above results, it may easily be understood that the compound of this invention has almost the same degree of effectiveness against insects as rotenone.

EXAMPLE 12

20 milligrams of each of rotenone and dl-nordihydro-rotenone were formulated in the form of emulsions by using 100 milligrams of chloroform and 15 milligrams of Triton X–100, respectively. The emulsions thus obtained were suspended into water to form dilute suspensions of various concentrations. A leaf of radish infested with two-spotted spider mite (*Tetranychus bismaculatus*) was set in a 100 milliliter Erlenmeyer flask, and 3 milliliters of the said test medium were sprayed thereon under a pressure of 5 lb. After 24 hours, the dead number and the survival number of the mites were calculated, and kill percent was measured. Each test was made at the same time under the same conditions with that of rotenone and dl-nordihydro-rotenone. In each case, the tests were conducted 10 times and the mean kill percent was calculated therefrom. The results were as follows:

EFFECTIVENESS FOR TWO-SPOTTED SPIDER MITE

| Concentration | dl-Nordihydro-rotenone kill, percent | Rotenone kill, percent |
|---|---|---|
| X 500 | 45.0 | 44.9 |
| X 1000 | 36.3 | 38.4 |

According to the above table, one can easily understand that the compound of this invention has the same degree of effectiveness for mites as has rotenone.

EXAMPLE 13 dl-Nordihydro-rotenone and rotenone were formulated as emulsions, respectively, by using Triton X–100 as in Example 12. To these emulsions, an adequate amount of water was added to make various concentrations of spray liquids. Apple twigs infested with green aphid (*Aphis pomi*) were dipped in the said test solutions. The excess liquid was carefully shaken off and the twigs were transferred to large mouthed bottles. A large sheet of paper was placed on each bottle, and the edge of which was bent downward and tied with string. After 24 hours, the total number of aphids and those found dead were counted and the kill percent was calculated in each case. A check using water was run simultaneously. The results were as follows:

EFFECTIVENESS FOR APPLE APHID

| Concentration gram to milliliters | dl-Nordihydro-rotenone kill, percent | Rotenone kill, percent |
|---|---|---|
| 1:10,000 | 91.4 | 93.4 |
| 1:20,000 | 80.3 | 91.5 |
| Check (water) | 10.6 | |

We claim:

1. A process for producing nordihydro-rotenone having the formula:

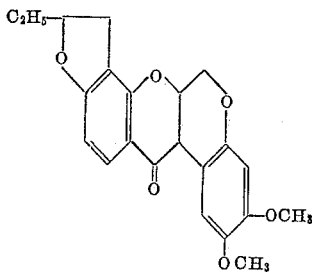

which comprises: (1) contacting nordihydro-tubanol having the formula

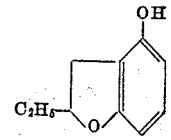

with lower-alkyl 2-cyanomethyl-4,5-dimethoxy-phenoxy-acetate in the presence of hydrochloric acid and a catalyst selected from the group consisting of aluminum chloride and zinc chloride, (2) hydrolyzing the formed reaction product whereby nordihydro-derris acid is formed, (3) heating the nordihydro-derris acid in the presence of acetic anhydride under reflux whereby nordihydro-dehydrorotenone is formed, (4) contacting the nordihydro-dehydro-rotenone with alkali metal borohydride, whereby nordihydro-rotenol is formed, and (5) contacting the nordihydro-rotenol with an aluminum alkoxide and a ketone, the former being a member selected from the group consisting of aluminum isopropoxide and aluminum tertbutoxide and the latter being a member selected from the group consisting of acetone, cyclohexanone and diphenyl ketone.

2. A process in accordance with claim 1 in which the lower alkyl 2-cyanomethyl-4,5-dimethoxy-phenoxyacetate is methyl 2-cyanomethyl-4,5-dimethoxy-phenoxyacetate.

3. A process in accordance with claim 1 in which the lower-alkyl 2-cyanomethyl-4,5-dimethoxy-phenoxyacetate is ethyl 2-cyanomethyl-4,5-dimethoxy-phenoxyacetate.

4. A process for producing nordihydro-derris acid having the formula

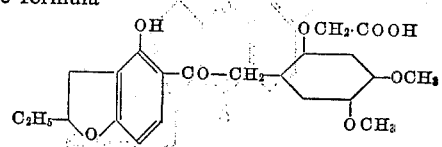

which comprises: (1) contacting nordihydro-tubanol having the formula

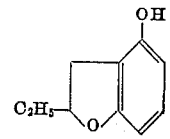

with lower-alkyl 2-cyanomethyl-4,5-dimethoxy-phenoxyacetate in the presence of hydrochloric acid and a catalyst selected from the group consisting of aluminum chloride and zinc chloride, and (2) hydrolyzing the formed reaction product, whereby nordihydro-derris acid is formed.

5. A process for producing nordihydro-dehydrorotenone having the formula

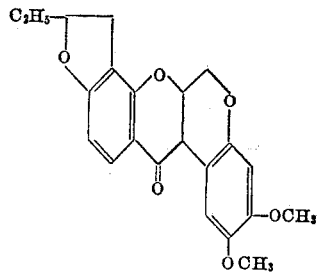

which comprises heating nordihydro-derris of the formula

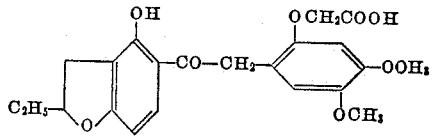

in the presence of acetic anhydric, whereby nordihydro-dehydrorotenone is formed.

6. A process for producing nordihydro-rotenol having the formula

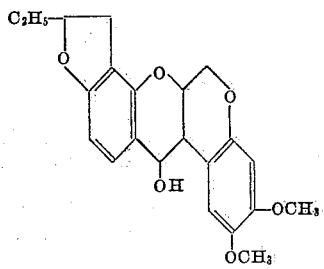

which comprises contacting nordihydro-rotenone of the formula

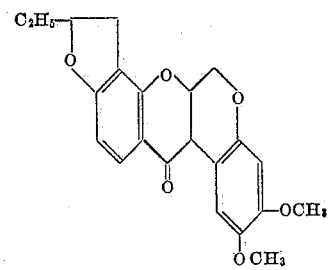

with alkali metal boro-hydride.

7. A process for producing nordihydro-rotenone having the formula

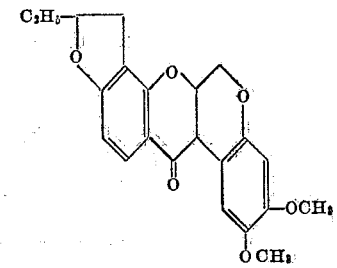

which comprises contacting nordihydro-rotenol represented by the formula

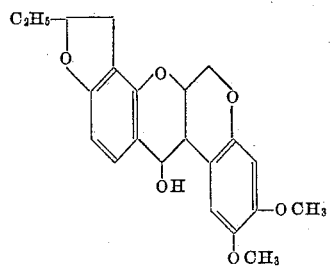

with an aluminum alkoxide and a ketone, the former being a member selected from the group consisting of aluminum isopropoxide and aluminum tert-butoxide and the latter being a member selected from the group consisting of acetone, cyclohexanone and diphenyl ketone.

References Cited in the file of this patent

UNITED STATES PATENTS

| | | |
|---|---|---|
| 2,320,746 | Paul | June 1, 1943 |
| 2,806,039 | Murray et al. | Sept. 10, 1957 |
| 2,879,275 | Feichtinger et al. | Mar. 24, 1959 |
| 2,905,701 | Nutting et al. | Sept. 22, 1959 |
| 2,947,760 | Bruin et al. | Aug. 2, 1960 |

OTHER REFERENCES

LaForge et al.: Jour. Am. Chem. Soc., vol. 52, pages 1088–98 (1930).

Takei et al.: Beilstein (Handbuch, 4th ed.), 2nd supp., vol. 19, pages 436–437 (1952).

Butenandt et al.: Beilstein (Handbuch 4th ed.), 2nd supp., vol. 18, page 211 (1952).

Frear: Chemistry of the Pesticides, Van Nostrand, (New York, 1955), 3rd ed., pages 188 and 190.